United States Patent
Huemiller, Jr.

(10) Patent No.: US 7,310,741 B2
(45) Date of Patent: Dec. 18, 2007

(54) PHASE ADJUSTED DELAY LOOP EXECUTED BY DETERMINING A NUMBER OF NOPS BASED ON A MODULUS VALUE

(75) Inventor: Louis D. Huemiller, Jr., San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 534 days.

(21) Appl. No.: 10/920,835

(22) Filed: Aug. 17, 2004

(65) Prior Publication Data

US 2006/0041771 A1     Feb. 23, 2006

(51) Int. Cl.
*G06F 1/12*     (2006.01)

(52) U.S. Cl. ...................... 713/401; 712/219

(58) Field of Classification Search ............... 713/401; 712/219

See application file for complete search history.

(56) References Cited

U.S. PATENT DOCUMENTS 5,958,044 A *   9/1999   Brown et al. ............... 712/219
6,275,929 B1 *  8/2001   Blum et al. ................ 712/219

* cited by examiner

*Primary Examiner*—Chun Cao
*Assistant Examiner*—Albert Wang

(57) ABSTRACT

In an embodiment of the invention, a method for a phase adjusted delay loop, includes: determining a requested delay value for a code path; and executing a delay loop in the code path in order to obtain a loop delay value that is in phase with the requested delay value. The act of executing the delay loop may include: executing at least one No-operation instruction (NOP) to adjust the loop delay value and to adjust the phase of the loop delay value.

14 Claims, 3 Drawing Sheets

PHASE ADJUSTED DELAY LOOP EXECUTED BY DETERMINING A NUMBER OF NOPS BASED ON A MODULUS VALUE

TECHNICAL FIELD

Embodiments of the present invention relate generally to computer systems, and more particularly to a phase adjusted delay loop.

BACKGROUND

Delay loops are used as a software based method to cause an execution path (code path) to take at least a specified amount of time. In previous approaches, delay loops have been implemented through the use of a loop that reads the current time, and then calculates the difference of the current time from the start time (entry time). This delay loop is repeated (executed) until the calculated difference is greater than or equal to the requested delay. Ideally, the loop is executed until the difference between the current time and entry time is equal to the requested delay amount. On average, the amount of time spent in executing the delay loop is one-half of the time for a single iteration of the delay loop. This additional average time of one-half of the time for a single delay loop iteration produces an amount of jitter that may cause errors and loss of synchronization.

Furthermore, the disadvantage of this previous approach is that the time taken to perform a single pass through the delay loop is taken (incurred) no matter how close in value the previously calculated delay (i.e., calculated difference) is to the requested delay. For example, if the calculated delay is just one (1) cycle short of the requested delay, then the entire delay loop will be executed again. This delay loop execution will cause the actual time spent in the delay loop to be the requested delay plus the number of cycles for a single pass of the delay loop minus one (1). For some processors, this additional time for a single pass of the delay loop can be greater than approximately 30 cycles in the worst case scenario.

Therefore, the current technology is limited in its capabilities and suffers from at least the above constraints and deficiencies.

SUMMARY OF EMBODIMENTS OF THE INVENTION

In an embodiment of the invention, a method for a phase adjusted delay loop, includes: determining a requested delay value for a code path; and executing a delay loop in the code path in order to obtain a loop delay value that is in phase with the requested delay value.

The act of executing the delay loop may include: executing at least one No-operation instruction (NOP) to adjust the loop delay value and to adjust the phase of the loop delay value.

In another embodiment of the invention, an apparatus for a phase adjusted delay loop, includes: a computer system configured to determine a requested delay value for a code path and execute a delay loop in the code path in order to obtain a loop delay value that is in phase with the requested delay value.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

An embodiment of the invention solves the problem of non-deterministic jitter from a delay loop. An embodiment of the invention provides the following advantages. An embodiment of the invention permits the creation of delay loops that are accurate down to a single clock, instead of N/2, where N is the number of cycles for a single pass through the delay loop. Experimentation has typically shown N equal to approximately N=5 for HP PA-RISC based processors (Hewlett-Packard's range of reduced instruction set computer (RISC) based processors), and at least N≧27 for Itanium processors. Thus, in prior methods the average delay accuracy for HP-PA-RISC and Itanium based processors is approximately 2.5 and 13.5 cycles, respectively.

Figure 1:
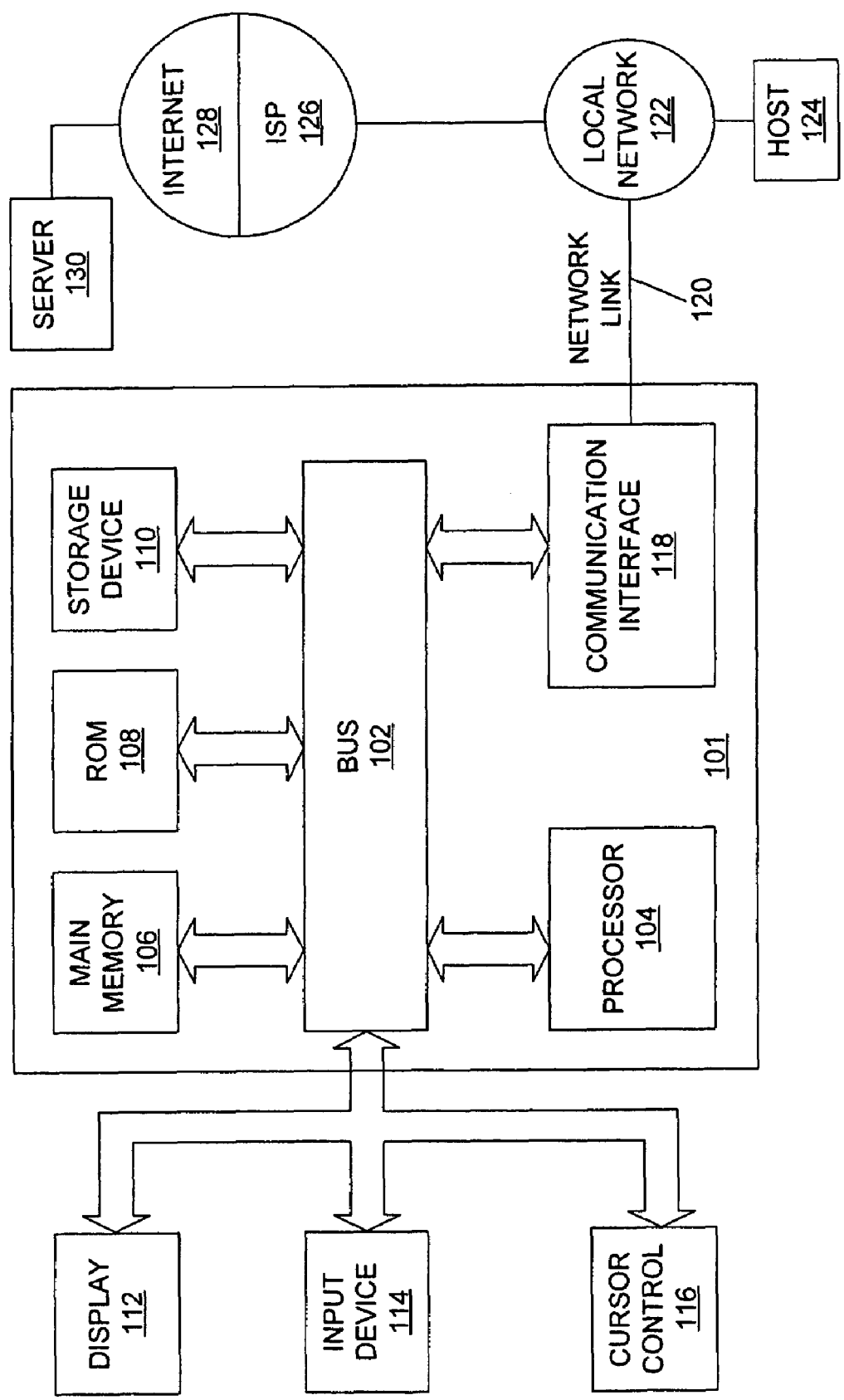
FIG. 1 is a functional block diagram of a system in accordance with an embodiment of the invention.

FIG. 1 is a block diagram illustrating an exemplary computer system 101 upon which an embodiment of the invention may be implemented. An embodiment of the invention is usable with, for example, currently available personal computers, mini-mainframes, enterprise servers, multi-processor computers, and other suitable types of computing devices.

Computer system 101 includes a bus 102 or other communication mechanism for communicating information, and a processor 104 coupled with the bus 102 for processing information. Computer system 101 also includes a main memory 106, such as, for example, a random access memory (RAM) or other dynamic storage device. The main memory 106 is coupled to the bus 102 and stores information and instructions to be executed by the processor 104. The main memory 106 may also be used for storing temporary variables or other intermediate information during the execution of instructions to be executed by processor 104. Computer system 101 further includes a read only memory (ROM) 108 or other static storage device. The ROM 108 is coupled to the bus 102 and stores static information and instructions for the processor 104. A storage device 110, such as, for example, a magnetic disk or optical disk, may be provided in the computer system 101. The storage device 110 may be coupled to the bus 102 and stores information and instructions to be executed by the processor 104.

Computer system 101 may be coupled via the bus 102 to a display 112, such as a cathode ray tube (CRT) or a flat panel display, for displaying information to a computer user. An input device 114, which may include alphanumeric and other keys, is coupled to the bus 102 for communicating information and command selections to the processor 104. Another type of user input device is a cursor control 116, such as, for example, a mouse, a trackball, or cursor direction keys for communicating direction information and command selections to processor 104 and for controlling cursor movement on the display 112. This input device 114 typically has two degrees of freedom in two axes, a first axis (e.g., x-axis) and a second axis (e.g., y-axis) allowing the device to specify positions in a plane.

An embodiment of the invention is related to the use of a computer system 101, such as the illustrated system, to provide a phase adjusted delay loop and use thereof. According to one embodiment of the invention, a phase adjusted delay loop is provided by the computer system 101 in response to processor 104 executing sequences of instructions contained in memory such as, for example, main memory 106. Such instructions may be read into main memory 106 from another computer-readable medium, such as the storage device 110. However, the computer-readable medium is not limited to devices such as the storage device 110.

For example, the computer-readable medium may include a floppy disk, a flexible disk, hard disk, magnetic tape, or any other magnetic medium, a CD-ROM (compact disk ROM), any other optical medium, punch cards, paper tape, any other physical medium with patterns of holes, a RAM (random access memory), a PROM (programmable ROM), an EPROM (erasable programmable ROM), a FLASH-EPROM, any other suitable memory chip or cartridge, a carrier wave embodied in an electrical, electromagnetic, infrared, or optical signal, or any other medium from which a computer can read. Execution of the sequences of instructions contained in the main memory 106 (or sequences of instructions contained in other computer-readable medium) causes the processor 104 to perform the process steps described below. In alternative embodiments, hard-wired circuitry may be used in place of or in combination with computer software instructions to implement an embodiment of the invention. Thus, embodiments of the invention are not limited to any specific combination of hardware circuitry and software.

Computer system 101 may optionally include a communication interface 118 coupled to the bus 102. Communication interface 108 provides a two-way data communication as is known to those skilled in the art. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented to function with the computer system 101. In any such implementation, communication interface 118 sends and receives electrical, electromagnetic, or optical signals which carry digital data streams representing various types of information. Of particular note, the communications through interface 118 may permit transmission or receipt of the operating software program scheduling information. For example, two or more computer systems 101 may be networked together in a conventional manner, with each computer system 101 using the communication interface 118.

Network link 120 typically provides data communication through one or more networks to other data devices. For example, network link 120 may provide a connection through local network 122 to a host computer 124 or to a data equipment operated by an Internet Service Provider (ISP) 126. ISP 126, in turn, provides data communication services through the world wide web packet data communication services through the world wide web packet data communication network now commonly referred to as the "Internet" 128. Of course, the Internet 128 may other suitable types of data communication network such as, for example, a locally provided and maintained communication network. Local network 122 and Internet 128 both use electrical, electromagnetic, or optical signals which carry digital data streams. The signals through the various networks and the signals on network link 120 and through communication interface 118, which carry the digital data to and from computer system 101, are exemplary forms of carrier waves for transporting the information.

Computer system 101 can send messages and receive data, including program code, through the network(s), network link 120, and communication interface 118. In the Internet example, a server 130 might transmit a requested code for an application program through Internet 128, ISP 126, local network 122 and communication interface 118. In accordance with an embodiment of the invention, one such downloaded application provides for a method for a phase adjusted delay loop, as described herein.

The received code may be executed by processor 104 as the code is received, and/or stored in storage device 110, or other non-volatile storage for later execution. In this manner, computer system 101 may obtain application code in the form of a carrier wave.

Figure 2:
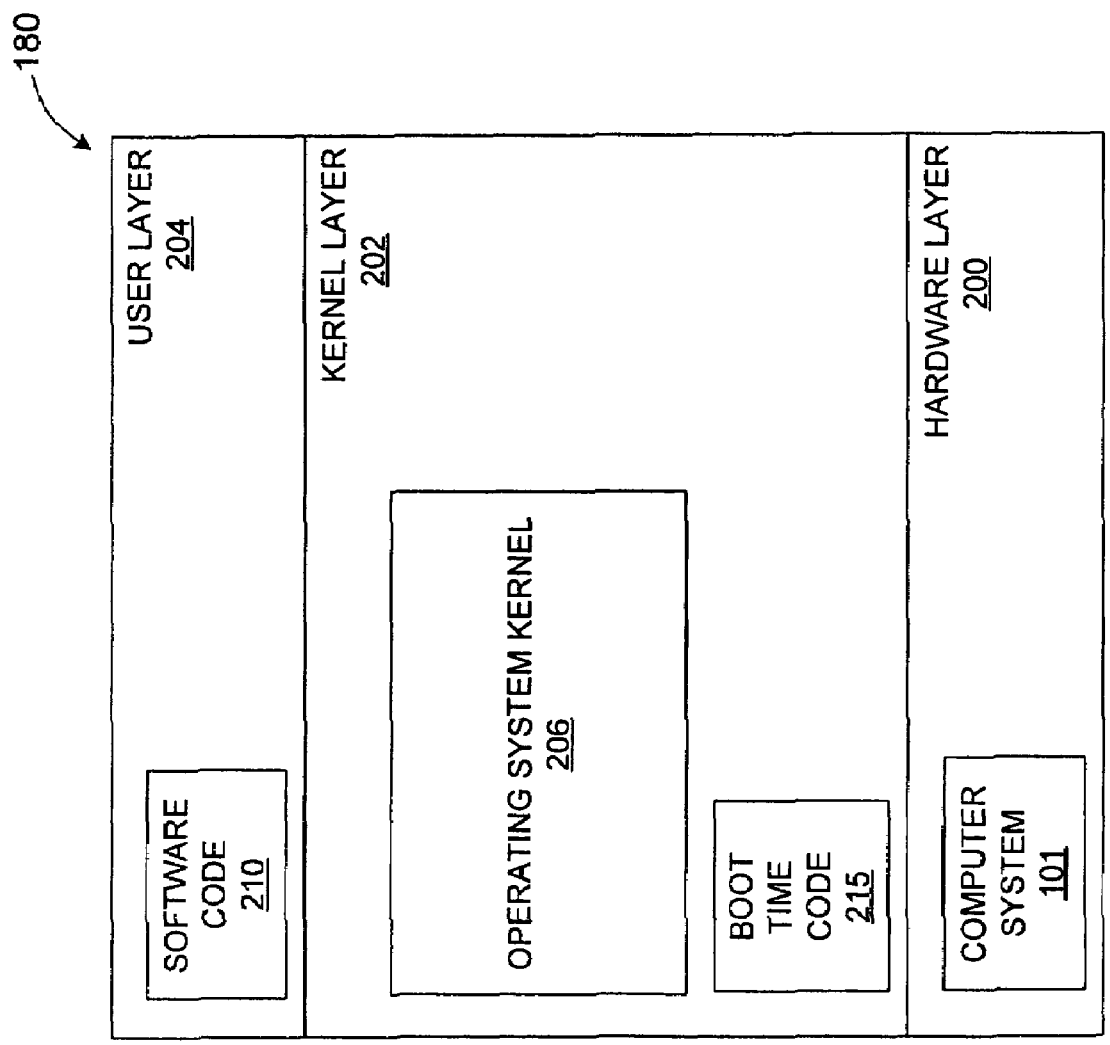
FIG. 2 is a functional block diagram that shows an apparatus that can implement an embodiment of the invention.

Reference is now made to FIG. 2, which illustrates a system (apparatus) 180, in accordance with an embodiment of the invention. The system 180 includes a hardware layer 200, a kernel layer 202, and a user layer 204. The hardware layer 200 includes the computer system 101 components as previously shown in FIG. 1.

The kernel layer 202 includes an operating system kernel 206. The operating system kernel 206 provides essential services such as, for example, memory management, process and task management, and disk management. The operating system kernel 206 may be part of an appropriate operating system that is executed by the processor 104. The operating system may be, for example, HP-UX®, LINUX, UNIX, MICROSOFT® WINDOWS® 95, MICROSOFT® WINDOWS® 98, MICROSOFT® WINDOWS® 2000, MICROSOFT® WINDOWS® XP, MICROSOFT® WINDOWS® NT, APPLE® MacOS®, IBM® OS/2®, and the like.

The user layer 204 may include any suitable application software such as, for example, a spreadsheet, word processor, utility software, web browser, visualization, simulation, or graphics software, and/or other types of software.

An embodiment of the invention provides a method for testing a code path. The code path may be in, for example, a software code 210. The software code 210 may be found in, for example, the user layer 204 or the kernel layer 202.

The programming environment (which includes, for example, various software shown in FIG. 2 such as the software code 210, and/or operating system kernel 206 may be programmed by use of known programming techniques and may be based upon any suitable programming language such as for example, C, C++, JAVA, PASCAL, ADA, COBOL, BASIC, FORTRAN, PERL, PYTHON, or derivatives thereof or other suitable programming languages.

Figure 3:
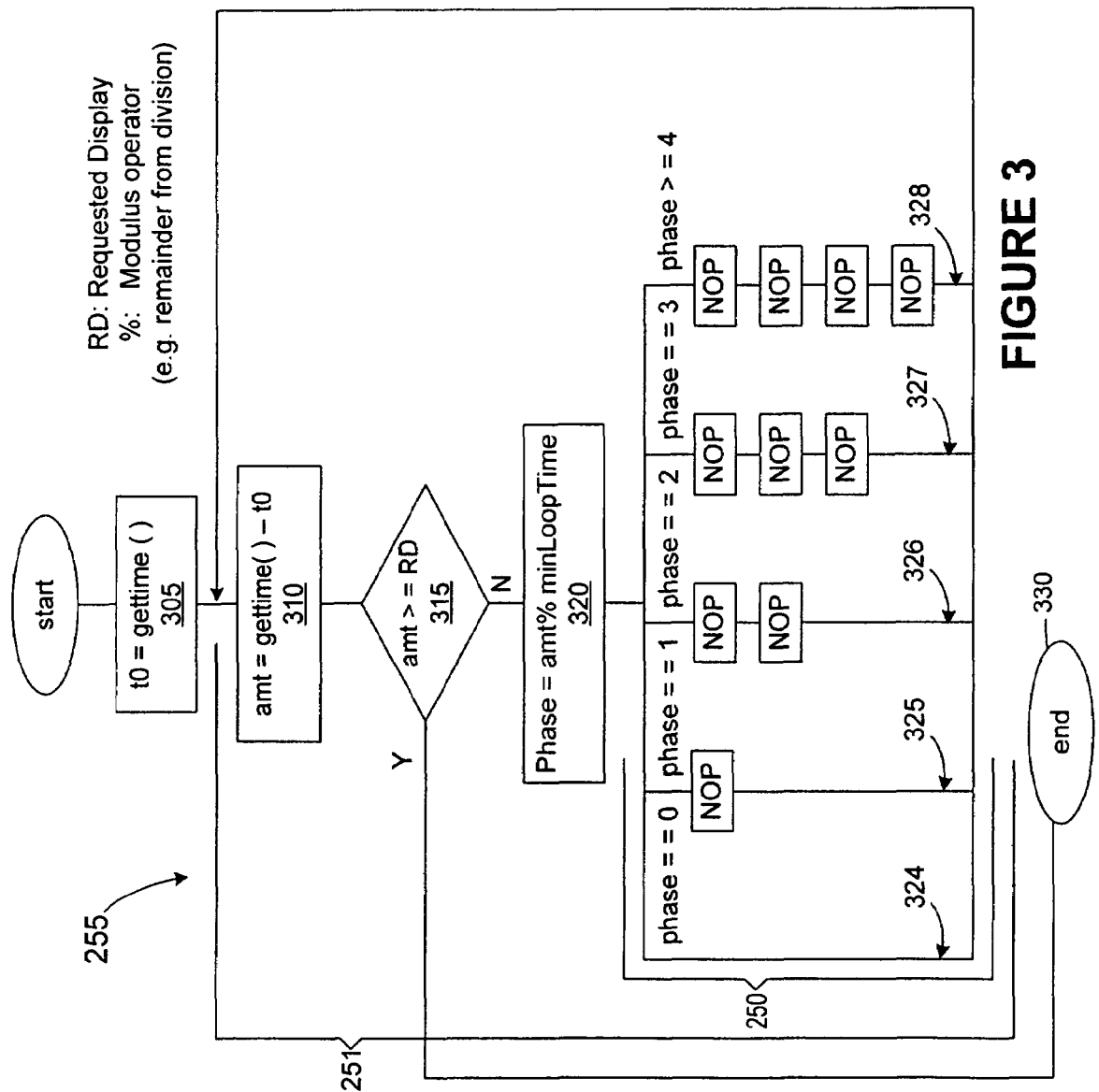
FIG. 3 is a functional block diagram that shows the execution of a delay loop, in accordance with in an embodiment of the invention.

FIG. 3 is a functional block diagram that shows the execution of delay loop in a code path in the software code 210 (FIG. 2) or delay loop in a code path in another software code, in accordance with in an embodiment of the invention. In particular, one or more delay loops 251 in a code path 255 can be adjusted in delay time, so that the loop delay of delay loop 251 is in phase with a requested delay amount. As known to those skilled in the art, a code path is an instruction sequence for completing a specific task by a software program.

The delay loop 251 can include one or more No-Operation (NOP) instructions (generally, NOP 260) to control or vary the amount of time for a single pass of the delay loop 251. A default amount of time per pass through the loop 251 is determined at boot time by the processor 104 by execution of the boot time code 215 (FIG. 2), and that default time amount (which is stored in the variable minLoopTime) is varied by use of one or more NOP instructions 260 where each NOP instruction 260 typically provides a one (1) cycle delay, so that the current loop delay value (amt) of delay loop 251 becomes in phase with a requested delay value (RD). As a result, an embodiment of the invention provides a new method that relies on adjusting the delay (amt) in a delay loop 251 when the current time is retrieved to be in phase with the requested total delay (RD). This is accomplished by providing a delay loop 251 that contains NOP instructions 260 that may be conditionally used to vary the amount of time taken by a single pass of the delay loop 251. As known to those skilled in the art, an NOP instruction is used in computer programming to instruct a software program to do nothing. It does though have the side effect of taking time to execute a NOP. An NOP is a sequential instruction, that always performs the same operation of nothing. A conditional statement is a statement used in programming that is performed if the statement is true or false.

In the code path 255, the entry time during the beginning of path execution is measured by t=gettime( ) at block 305. The entry time is denoted as $t_0$. The minimum time through the loop is measured at system boot time and kept in a global variable (minLoopTime), and this execution time amount can be varied by use of a variable delay path 250.

The measurement of the minimum time through the delay loop 251 is done at boot time by requesting small delays, while measuring the actual time taken to execute the delay loop 251. This is done with the minLoopTime global variable set equal to 1, which causes the calculated phase value to always be equal to 0.

The results from executing with a minLoopTime value of 1, will show a step increase in the amount of time taken to execute the delay loop 251. These step increases are the results of additional passes needed through the delay loop 251. The difference in these step amounts is the minimum time to execute the loop.

For example, Table 1 below shows one possible set of requested versus actual delay times with minLoopTime equal to 1:

TABLE 1

| Requested delay time | Actual delay time |
|---|---|
| 10 | 12 |
| 11 | 12 |
| 12 | 12 |

TABLE 1-continued

| Requested delay time | Actual delay time |
|---|---|
| 13 | 17 |
| 14 | 17 |
| 15 | 17 |
| 16 | 17 |
| 17 | 17 |
| 18 | 22 |
| 19 | 22 |

Table 1 shows the actual delays increasing in steps of 5. Thus the actual measured minLoopTime value for this example is 5. Once this value is determined, the boot time code 215 would change the initial minLoopTime setting of 1 to the measured time, which in this case is 5. Before this is done, the code path 255, would behave as in previous approaches, with a slightly longer loop delay time due to the added calculation of the phase amount. Once the measured minLoopTime has been saved in the global variable, this code path 255 will then behave as a phase adjusted delay loop.

In block 310 of FIG. 3, the delay time to execute the delay loop 251 is determined by calculating the difference between the current time and the entry time (i.e., amt=gettime( )−$t_0$).

In block 315, the delay time to execute the delay loop 251 is compared with the requested delay (RD). If the delay time to execute the delay loop 251 is greater than or equal to the requested delay (RD) (i.e., amt>=RD), then the delay loop 251 is not executed in the code path 255. On the other hand, if the delay time to execute the delay loop 251 is not greater than or not equal to the requested delay (RD) (i.e., amt<RD), then the operation in block 320 is performed.

In block 320, the phase is calculated based upon the value of amt % minLoopTime. As known to those skilled in the art, the modulus operator is %. The differences between a modulus and a remainder are that modulus is only defined for positive integer values, while remainder can be calculated for any real number, even negative ones. Note that most implementation of modulus will produce a result when one or both of its operands are negative, by the C language standard specifies the result as machine-dependent. A clearer difference, is the C language standard does not allow % to be used on the floating point types. It only works on integral operands.

Generally, "63 mod 10" means the remainder left when 63 is divided by 10. For instance, 23 mod 12=11. In some programming languages, this operation is written as 23% 12.

In FIG. 3, the phase value (calculated by amt % minLoopTime) determines the number of NOPs 260 that are executed. For example, if the phase value equals 0, then zero (0) NOP 260 are executed (as shown in path 324). If the phase value equals 1, then one (1) NOP 260 is executed (as shown in path 325). If the phase value equals 2, then two (2) NOPs 260 are executed (as shown in path 326). If the phase value equals 3, then three (3) NOPs 260 are executed (as shown in path 327). If the phase value equals 4 or is greater than 4, then four (4) NOPs 260 are executed (as shown in path 328).

The step in blocks 310 and 315 are then repeated, so that the current loop delay time amount (amt) is calculated in block 310 and the current loop delay time amount (amt) is compared with the requested delay (RD) in block 315 to determine if the delay loop is executed again or is bypassed. As an example, assume that the minimum time through the loop is 5, as stored in the minLoopTime variable. Assume further that the requested delay (RD) is 30. If the loop delay (amt) is 29, then the phase value will be 4, as determined in block 320: phase=amt % minLoopTime=29% 5=4. Since the phase is 4, the 4 NOPs 260 in path 328 will be executed. Subsequently, the loop delay (amt) will be 33, as determined in block 310: amt=gettime( )-t0=33-0=33. In block 315, since amt>=RD (i.e., 33>29), the delay loop 251 is not executed, and execution of the path 255 ends at block 330.

Typically, larger values of NOP delays allow for a more rapid phase adjustment, with the disadvantage of more code. The designer needs to make a tradeoff between the total code size and the rate by which the correct phase can be obtained.

The number of NOPs 260 is determined by implementation.

Therefore, the default minimum time amount is varied as needed in order to obtain, when the current time (gettime( )) is measured, a loop delay time (amt) that is in phase with the requested total delay (RD).

The next example demonstrates the following important points: (a) how to handle phase values greater than the maximum number of NOPs; and (b) once in phase (phase equal to 0), all future passes stay in phase by executing the path with zero (0) NOPs.

As an example, consider a delay loop 251 that has been designed to normally take approximately 20 cycles to execute (i.e., minLoopTime in the loop is 20 cycles), but can also be varied to take approximately 21, 22, 23, or 24 cycles to execute, by introducing 1, 2, 3, or 4 additional NOPs 260, respectively. Furthermore, assume in this example that on the current pass through the delay loop 251, the amount of additional time needed for the requested delay is 130 cycles. To accomplish the requested additional delay amount of 130 cycles, the following amounts of time would be taken through the delay loop 251 as shown in Table 2.

TABLE 2

| Cycles taken (CT) | Cycles remaining (amt) | Pass # through the delay loop |
|---|---|---|
|  | 130 | Prior to first pass |
| 24 | 106 | First |
| 24 | 82 | Second |
| 22 | 60 | Third |
| 20 | 40 | Fourth |
| 20 | 20 | Fifth |
| 20 | 0 | Sixth |

As shown in Table 2, for the first two passes through the delay loop 251, the maximum number of additional NOP instructions are taken. This is because the modulus (%) of the remaining time versus the default time per loop is greater than the time that is taken by executing all of the available extra NOP instructions 260.

In the example of Table 2, the maximum number of additional NOP instructions 260 provides a total delay of approximately four (4) cycles, as provided by the 4 NOPs 260 in path 328 in FIG. 3. However, in other examples, the maximum available number of additional NOPs 260 that are configured may vary. Each of the NOP instructions 260 typically provides a delay of approximately one (1) cycle. For the first two passes through the delay loop 251, the modulus of the time remaining is 10 (130% 20=amt % minLoopTime) and 6 (106% 20), respectively. In other words, the modulus 10 is obtained from the remainder in the mathematical operation 130/20, and the modulus 6 is obtained from the remainder in the mathematical operation 106/20.

Note that after the first pass through the delay loop 251, if the 4 NOPs 260 in path 328 are not executed, then the remaining cycles would be 110 cycles (110 cycles=previous cycles remaining−minLoopTime=130−20=130−20). However, as shown in Table 1, for the first pass through the delay loop 251, the maximum number of additional NOP instructions 260 are determined by the implementation, and this maximum number of additional NOPs 260 provides an additional delay of 4 cycles in the delay loop 251. The maximum number of additional NOPs 260 are selected because the modulus value of 10 is greater than the 4 cycles delay provided by executing the available extra 4 NOP instructions 260. Therefore, after the first pass through the delay loop 251 along with the execution of the 4 NOPs 260 in path 328, the remaining cycles (amt) would be 106 cycles (106 cycles=previous cycles remaining−CT=130−24), as shown in Table 2, where the parameter cycles taken (CT) is the delay value provided by the delay loop 251 during a particular pass. The delay through the delay loop 251 during one loop pass would be 24 cycles if the 4 NOPs 260 are executed.

During the second pass through the delay loop 251, if the 4 NOPs 260 are not executed, then the remaining cycles would be 86 cycles (86 cycles=previous cycles remaining−minLoopTime=106−20). However, as shown in Table 1, for the second pass through the delay loop 251, the maximum number of additional NOP instructions 260 are taken which amount to an additional delay of 4 cycles. This is because the modulus value of 6 is greater than the 4 cycles delay provided by executing the available extra 4 NOP instructions 260 in path 328. Therefore, after the second pass through the delay loop 251 along with the execution of the 4 NOPs 260 in path 328 during the pass through the delay loop 251, the remaining cycles would be 82 cycles (82 cycles=previous cycles remaining−CT=106−24).

For the third pass through the delay loop 251, only two additional NOP instructions 260 (in path 326) are executed, so that the total time taken through the delay loop 251 is approximately 22 cycles. The choice to take approximately 22 cycles is made because the modulus of the remaining time is 2 (82% 20), i.e., the remainder is 2 for the mathematical operation 82/20, and so approximately 2 additional cycles are needed. Therefore, after the third pass through the delay loop 251 along with the execution of two NOPs during the pass through the delay loop 251, the remaining cycles would be 60 cycles (60 cycles=previous cycles remaining−CT=82−22). This third pass of the delay loop 251 performs a key operation in that it gets the default loop delay (minLoopTime) when the current time is measured in phase with the total requested delay time. For all the remaining passes (fourth pass through sixth pass), the remaining time modulus per loop is equal to zero. Therefore, the current time is measured in phase with the total requested delay time because the remaining time modulus per loop is now zero. Specifically, for the fourth pass, the modulus is zero for 60% 20, and as a result, none of the NOPs 260 is executed, while path 324 with no NOPs is instead executed, and, therefore, the delay loop 251 will provide a delay of 20 cycles. For the fifth pass, the modulus is zero for 40% 20, and as a result, none of the NOPs 260 is executed, while path 324 with no NOPs is instead executed, and, therefore, the delay loop 251 will provide a delay of 20 cycles. For the sixth pass, the modulus is zero for 20% 20, and as a result, none of the NOPs 260 is executed, while path 324 with no NOPs is instead executed, and, therefore, the delay loop 251 will provide a delay of 20 cycles. Thus the default time (min-LoopTime) is taken until the total requested delay (RD) of 130 cycles has occurred.

Even with the phase adjusted delay loop 251, the total amount of time taken during a loop pass will always be greater than the requested time (RD). This is because there is a small amount of processing that needs to be performed between obtaining a time with a great enough difference and exiting the delay loop. The phase adjusted delay loop 251 has the advantage that a predictable amount of additional delay will occur during certain conditions as discussed in the example of FIG. 3.

The various engines, tools, or modules discussed herein may be, for example, software, firmware, commands, data files, programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for a phase adjusted delay loop, the method comprising:
   determining a requested delay value for a code path; and
   executing a delay loop in the code path in order to obtain a loop delay value that is in phase with the requested delay value;
   wherein the act of executing the delay loop comprises:
      determining a number of NOPs (no-operation instructions) to execute based on a modulus value, and
      executing at least one NOP to adjust the loop delay value and to adjust a phase of the loop delay value.

2. The method of claim 1, wherein the modulus value comprises a modulus of a current loop delay time (amt) versus a default time per pass of the delay loop (minLoopTime).

3. The method of claim 2, wherein the default time is selected as the loop delay value during a pass through the delay loop, if the modulus value zero.

4. The method of claim 2, wherein all available NOPs are executed during a pass through the delay loop, if the modulus value is greater than a delay value provided by execution of all available NOPs in the delay loop.

5. The method of claim 2, wherein an amount of NOPs equal to the modulus value is executed in the delay loop during a pass through the delay loop, if the modulus value is less than a delay value provided by execution of all available NOPs in the delay loop and is not equal to zero.

6. The method of claim 1, wherein the code path is in a software code.

7. An apparatus for a phase adjusted delay loop, the apparatus comprising:
   a computer system configured to determine a requested delay value for a code path and execute a delay loop in the code path in order to obtain a loop delay value that is in phase with the requested delay value;
   wherein the computer system executes the delay loop by determining a number of NOPs (no-operation instructions) to execute based on a modulus value and by executing at least one NOP to adjust the loop delay value and to adjust a phase of the loop delay value.

8. The apparatus of claim 7, wherein the modulus value comprises a modulus of a current loop delay value (amt) versus a default time per pass of the delay loop (minLoopTime).

9. The apparatus of claim 8, wherein the default time is selected as the loop delay value during a pass through the delay loop, if the modulus value zero.

10. The apparatus of claim 8, wherein all available NOPs are executed during a pass through the delay loop, if the modulus value is greater than a delay value provided by execution of all available NOPs in the delay loop.

11. The apparatus of claim 8, wherein an amount of NOPs equal to the modulus value is executed in the delay loop during a pass through the delay loop, if the modulus value is less than a delay value provided by execution of all available NOPs in the delay loop and is not equal to zero.

12. The apparatus of claim 7, wherein the code path is in a software code.

13. An article of manufacture, comprising:
  a computer-readable medium having stored thereon instructions to permit a computer system to:
  determine a requested delay value for a code path; and
  execute a delay loop in the code path in order to obtain a loop delay value that is in phase with the requested delay value, by determining a number of NOPs (no-operation instructions) to execute based on a modulus value and by executing at least one NOP to adjust the loop delay value and to adjust a phase of the loop delay value.

14. An apparatus for a phase adjusted delay loop, the apparatus comprising:
  means for determining a requested delay value for a code path and for executing a delay loop in the code path in order to obtain a loop delay value that is in phase with the requested delay value, and
  wherein said means for determining and for executing includes means for determining a number of NOPs (no-operation instructions) to execute based on a modulus value and for executing at least one NOP to adjust the loop delay value and to adjust a phase of the loop delay value.

* * * * *

UNITED STATES PATENT AND TRADEMARK OFFICE
CERTIFICATE OF CORRECTION

PATENT NO. : 7,310,741 B2
APPLICATION NO. : 10/920835
DATED : December 18, 2007
INVENTOR(S) : Louis D. Huemiller, Jr.

Page 1 of 1

It is certified that error appears in the above-identified patent and that said Letters Patent is hereby corrected as shown below:

In column 10, line 40, in Claim 3, after "value" insert -- is --.

In column 11, line 3, in Claim 9, after "value" insert -- is --.

Signed and Sealed this

Fifteenth Day of July, 2008

JON W. DUDAS
*Director of the United States Patent and Trademark Office*